Figure 2:
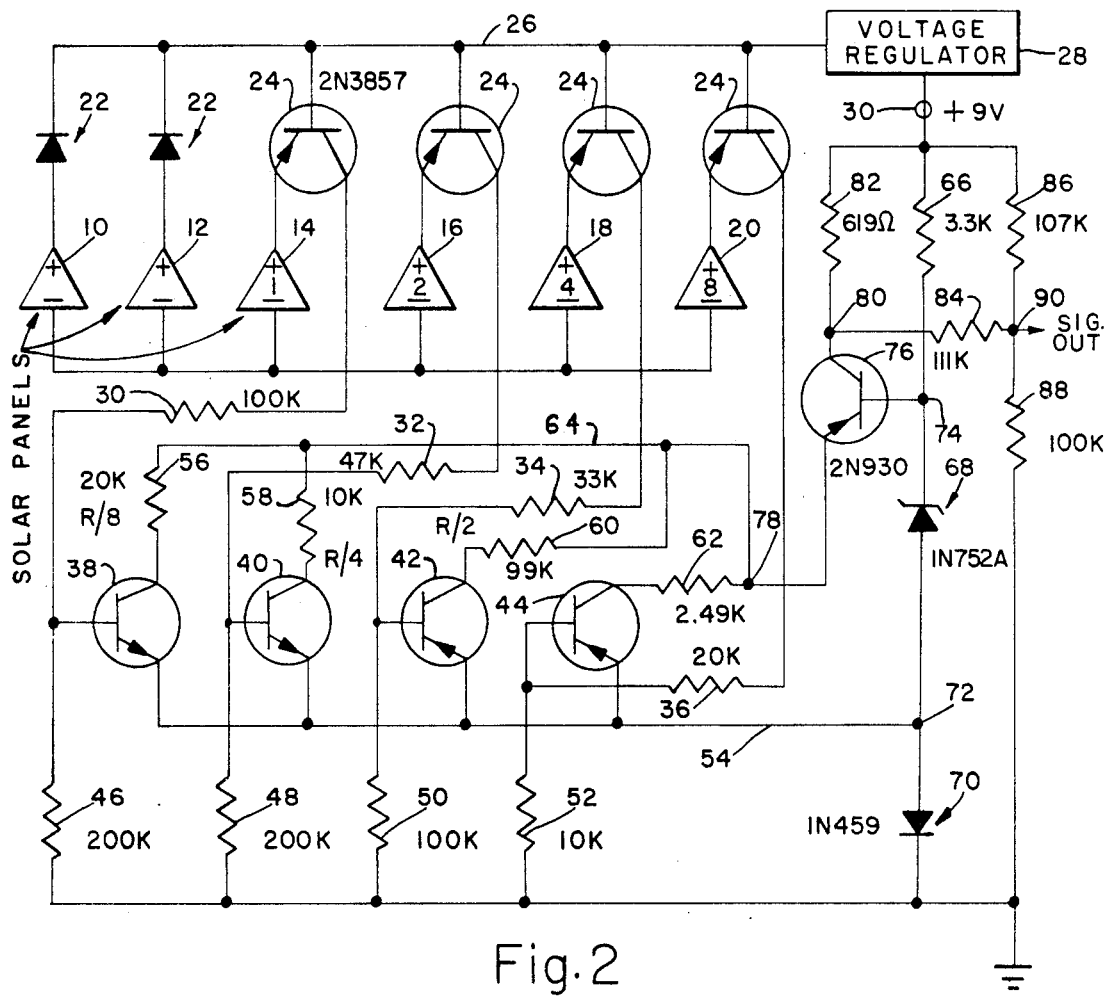

United States Patent

[11] 3,566,131

[72] Inventor Franklin G. Kelly
 Long Beach, Calif.
[21] Appl. No. 673,415
[22] Filed Oct. 6, 1967
[45] Patented Feb. 23, 1971
[73] Assignee TRW Inc.
 Redondo Beach, Calif.

[54] SOLAR CELL CURRENT SENSING CIRCUIT EMPLOYING DIGITAL-TO-ANALOG ELECTRICAL SIGNAL CONVERSION
3 Claims, 2 Drawing Figs.
[52] U.S. Cl............................................. 250/214,
 250/203 (Disclosure); 307/311
[51] Int. Cl............................................. H01j 39/12
[50] Field of Search.................................. 250/199,
 203, 209, 214; 307/311, 340 (Inquired)

[56] References Cited
UNITED STATES PATENTS

| | | | |
|---|---|---|---|
| 3,098,934 | 7/1963 | Wilson et al. | 250/203 |
| 3,205,361 | 9/1965 | Albus | 250/203 |
| 3,407,301 | 10/1968 | Kovanic | 250/199 |
| 3,424,907 | 1/1969 | Fischell | 250/203 |

*Primary Examiner*—Archie R. Borchelt
*Assistant Examiner*—C. M. Leedom
*Attorneys*—Daniel T. Anderson, Jerry A. Dinardo and Edwin A. Oser ABSTRACT: A current sensing circuit for use in a satellite attitude detecting system employs an array of solar cell panels connected in parallel circuits. Each parallel circuit includes a solar cell panel connected in series with the input circuit of a transistor. The output circuit of the transistor provides a logic output current that is fed to a digital-to-analog converter. The output current remains constant for all values of solar intensity that exceed a predetermined threshold level.

Franklin G. Kelly
*INVENTOR.*

BY *Jerry G. Dinardo*

AGENT

3,566,131

SOLAR CELL CURRENT SENSING CIRCUIT EMPLOYING DIGITAL-TO-ANALOG ELECTRICAL SIGNAL CONVERSION

CROSS REFERENCE TO RELATED APPLICATIONS

This invention is an improvement of the invention disclosed and claimed in U.S. PAT. No. 3,493,765, issued Feb. 3, 1970.

BACKGROUND OF THE INVENTION

1. Field of the Invention

This invention relates to improvements in satellite attitude detecting systems which employ solar cell panels for generating a logic signal that is fed to a digital-to-analog converter, which in turn produces an output signal that is related to the orientation of the solar cells.

2. Description of the Prior Art

In satellites it is frequently important to determine the approximate angular position of the sun on a spacecraft-oriented coordinate system. Several devices are available to perform this function. The simplest and least expensive of all which is described in the above-referenced application and presently being employed in several environmental research satellites, will, due to its extreme sensitivity, respond to light reflected from the earth as well as the direct rays of the sun. If the satellite is placed in an orbit less than about 10,000-nautical miles altitude, earthshine will saturate the system and meaningless data will result. The invention described herein overcomes this problem.

SUMMARY OF THE INVENTION

The foregoing limitations of the prior art are overcome by the present invention by providing a solar cell panel and transistor arrangement in which current, rather than the voltage, delivered to the load by the solar cell panel is sensed. The useful range of the satellite attitude detection system is extended to altitudes as low as about 1,000 nautical miles.

Figure 1:
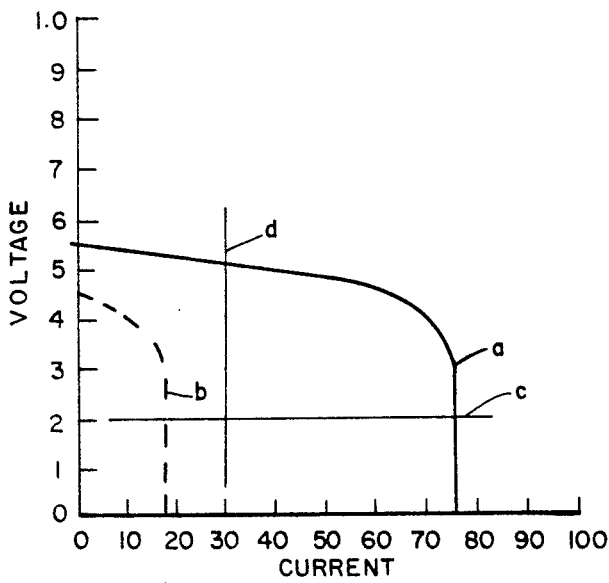

Each of the solar cell panels of an array are connected in series with the input circuit of a transistor. The output circuit is connected to a load such as a digital-to-analog converter. If one of the sensing solar cell panels is sufficiently well illuminated, that is by illumination in excess of that provided by earthshine, the transistor conducts solar cell current heavily and produces an output logic current that is fed to the digital-to-analog converter. The output logic current remains constant despite changes in illumination intensity, so long as the illumination exceeds a certain threshold value, such as that attributed to earthshine. In this way, earthshine is prevented from giving erroneous signals. BRIEF DESCRIPTION OF THE DRAWING In the drawings:

FIG. 1 is a graph of curves illustrating the voltage versus current relationship of typical solar cells for different levels of illumination; and FIG. 2 is a schematic circuit of an embodiment of the solar cell current sensing circuit according to the invention. DESCRIPTION OF THE PREFERRED EMBODIMENTS Referring now to the graph of FIG. 1 curve (a) shows the normal current versus voltage relationship for a typical solar cell illuminated with 140 milliwatts per square centimeter light intensity. This light intensity is equivalent to one solar constant. Curve (b) shows the current versus voltage relationship for the same solar cell that is illuminated by 0.25 solar constant, or 35 milliwatts per square centimeter, which is the average intensity of earthshine at 1,000 nautical miles.

Now when a solar cell is oriented away from the sun at an altitude of 1,000 nautical miles, the solar cell will be illuminated by earthshine, even though it is not exposed to the sun. Consequently, if an attitude detection system is used that senses a voltage in excess of a threshold level, such as that identified by the horizontal line (c), it will be seen that a voltage will be sensed due to earthshine alone, inasmuch as curve (b) has a portion exceeding the threshold level. Therefore, instead of no signal being detected due to the absence of direct solar illumination, an erroneous signal due to earthshine will be sensed.

Accordingly, this invention is predicated in part on the realization that erroneous signals can be eliminated if the attitude detecting system senses the current delivered by the solar cells rather than the voltage. Referring again to FIG. 1, by designing the attitude detection system to sense a current in excess of a certain threshold level above that due to earthshine, such as the threshold level illustrated by the vertical line (d) the system will respond only when the sensing solar cells are exposed to direct sunlight.

A solar cell current sensing circuit constructed in accordance with the principles of the invention is illustrated in FIG. 2. There is shown in this figure two groups of solar cell panels, each panel comprising a multiplicity of solar cells. The first group of solar cell panels, such as the panels 10 and 12, are used solely to supply electrical power for the operation of systems within a spacecraft. The second group of solar cell panels, such as panels 14, 16, 18, and 20, also serve as power supplying panels, but in addition they are employed in a predesigned physical orientation on the spacecraft to relate the physical position of the spacecraft relative to the sun for the purpose of determining the attitude of the spacecraft. This attitude detecting system is more fully disclosed in the above-identified copending application.

The solar cell panels 10 through 20 of both groups are connected in parallel circuits. Each of the solar cell panels 10 and 12 of the first group is connected in series with a diode 22, which is preferably of the solid state variety, such as a type 1N91. The solid state diodes 22 are known as isolation diodes because they isolate unilluminated solar cell panels from the load. That is, they allow current to flow to the load in their conducting direction when the solar cell panels are illuminated, but they prevent current from flowing from the load bus into the solar cell panels when the latter are not illuminated.

Each of the solar cell panels 14 through 20 of the second group is in series with the emitter-base circuit of a transistor 24. The transistors 24 have their bases connected to a common bus 26. Likewise, the cathodes of the diodes 22 are connected to the bus 26. The transistors 24 are preferably of the type 2N3857.

The solar cell panels 10 through 20 may deliver an unregulated output voltage of about 11 to 17 volts on the bus 26. A voltage regulator 28 regulates this voltage to about 9 volts at terminal 30 for operating a digital-to-analog converter, a preferred form of which will now be described. The digital-to-analog converter per se is the subject matter of concurrently filed copending application of Franklin G. Kelly, Ser. No. 673,233 entitled "Digital-to-Analogue Converter."

The output emitter-collector circuit of each transistor 24 is connected in series with a current limiting resistor, such as resistors 30, 32, 34, and 36, respectively. The current limiting resistors 30, 32, 34, and 36 are connected to the bases of switching transistors 38, 40, 42, and 44, respectively. The bases of switching transistors 38 through 44 are returned to ground through resistors 46, 48, 50, and 52, respectively. The emitters of switching transistors 38 through 44 are connected to a common bus 54. The collectors of switching transistors 38 through 44 are connected through metering or calibrating resistors 56, 58, 60, and 62, respectively, to a common bus 64.

A voltage divider is connected between supply voltage terminal 30 and ground, and includes a resistor 66, a zener diode 68, such as a type 1N752A, and a solid state diode 70, such as a type 1N459, with a junction point 72 between diode 70 and zener diode 68, and a junction point 74 between zener diode 68 and resistor 66.

A summing transistor 76, such as a type 2N930, has its base connected to junction point 74 of the voltage divider, its emitter connected to common bus 64 at a junction point 78, and its collector connected to a junction point 80. A summing resistor 82 is connected between junction point 80 and supply voltage terminal 30.

Three signal conditioning resistors 84, 86, and 88 are connected in a voltage dividing network. Resistor 84 is connected between junction point 80 and an output terminal 90. Resistor 86 is connected between supply voltage terminal 30 and output terminal 90. Resistor 88 is connected between output terminal 90 and ground.

The operation of the solar cell current sensing circuit will now be described in connection with the digital-to-analog converter. As discussed previously, the solar cell panels 14 and 20 are arranged on a satellite so that when one or a combination of these solar panels are illuminated, a digital output may be produced therefrom which can feed to the digital-to-analog converter to produce an output signal representing the orientation of the satellite. Thus, when solar cell panel 14 is illuminated by the sun, it will generate a heavy current that flows in the emitter-base circuit of its associated transistor 24. This heavy current will cause current to flow in the emitter-collector circuit of the transistor 24, thereby providing a logic signal that is fed to the digital-to-analog converter. The output or logic current of the transistor will remain constant so long as the solar illumination intensity level is above a threshold in excess of the intensity level of illumination due to earthshine, as explained previously.

Similarly, the other solar cell panels 16, 18, and 20 when sufficiently illuminated, will cause a constant current to flow in their respective transistor output circuits. The digital currents flow through the current limiting resistors 30 through 36 which limit the currents to low values to prevent unnecessary losses.

The digital currents flow into the emitter-base circuits of the switching transistors 38 through 44, respectively. The switching transistors 38 through 44 are normally turned off by means of the bias voltage, which is set by the diode 70 to about 0.6 volts. However, when the switching transistors 38 through 44 are turned on by the digital current, current will flow in the emitter-collector circuits of the switching transistors through the calibrating resistors 56 through 62, respectively. The value of current flowing through each of the calibrating resistors 56 through 62 is determined by resistance values. In the example shown, calibrating resistor 62 has a resistance value R, while calibrating resistors 60, 58, and 56 have resistance values that are R/2, R/4, and R/8, respectively.

Now referring to the voltage divider network including resistor 66, Zener diode 68, and bias setting diode 70, it is seen that the voltage across points 72 and 74 of the Zener diode 68 is constant because of the clamping effect of the Zener diode. The resistor 66 is used to set the current in the voltage dividing network to the operating range of the Zener diode 68. In the particular example illustrated, the Zener diode voltage is 7.5 volts. The summing transistor 76 is connected in a common base configuration. Thus, the emitter-current of transistor 76 is equal to the collector current minus a small amount of current flowing in the base. The voltage across points 74 and 78 is constant, so that the voltage across points 72 and 78 is constant. The current flowing through each of the calibrating resistors is a function only of their resistance values.

Thus, when solar panel 14 is illuminated, a current having a digit value of 1 will flow through calibrating resistor 56. When solar panel 16 is illuminated, a current having a digit value of 2 will flow through calibrating resistor 58. When solar panel 18 is illuminated, a current having a digit value of 4 will flow through calibrating resistor 60. When solar panel 20 is illuminated, a current having a digit value of 8 will flow through calibrating resistor 62. The numerals appearing in the solar panels 14—20 correspond to their respective digit values.

The summing transistor 76 sums all these currents because they all flow into the emitter-base circuit and cause substantially the same current to flow in the collector-emitter circuit thereof and through the summing resistor 82. The current flowing through the summing resistor 82 and thus the voltage at point 80 is a function only of the resistance values of the calibrating resistors 56 through 62. The voltage at point 80 therefore is representative of the state of illumination of the solar panels 14 through 20.

While the analogue output can be taken directly from point 80, it has been found convenient to employ the signal conditioning resistors 84 through 88 to adjust the bias of the output signal and the operating range of the output signal to satellite system requirements.

Although the transistors 24 in the solar cell current sensing circuit are shown as PNP type, they may be NPN. Likewise, while the switching transistors 38—44 and the summing transistor 76 are shown as NPN, they may be PNP.

The embodiments of the invention in which an exclusive property or privilege is claimed are defined as follows:

I claim:
1. A current sensing circuit for an array of solar panels, comprising:
   a. a plurality of parallel connected solar panel circuits;
   b. each of said circuits including a solar panel connected in series with the emitter-base input circuit of a transistor;
   c. said solar panel causing constant current to flow in the emitter-collector output circuit of said transistor when subjected to illumination in excess of a given threshold value; and
   d. a digital-to-analogue electrical signal converter to which said transistor emitter-collector output currents are fed for providing an electrical output representative of a particular numbered order in which said solar panels are energized.

2. The invention according to claim 1, and further including a current limiting means in series with the emitter-collector output circuit of each of said transistors.

3. The invention according to claim 2, wherein said current limiting means comprises a resistor.

UNITED STATES PATENT OFFICE
CERTIFICATE OF CORRECTION

Patent No. 3,566,131            Dated February 23, 1971

Inventor(s) Franklin G. Kelly

It is certified that error appears in the above-identified patent and that said Letters Patent are hereby corrected as shown below:

Column 2, line 52    delete "673,233" and substitute --673,425--

Signed and sealed this 29th day of June 1971.

(SEAL)
Attest:

EDWARD M. FLETCHER, JR.            WILLIAM E. SCHUYLER, J
Attesting Officer                     Commissioner of Patent